M. F. POTTS.
Assignor, by mesne assignments, to ENTERPRISE MANUFACTURING CO., and AMERICAN MACHINE CO.
Sad-Iron.
No. 9,020. Reissued Jan. 6, 1880.
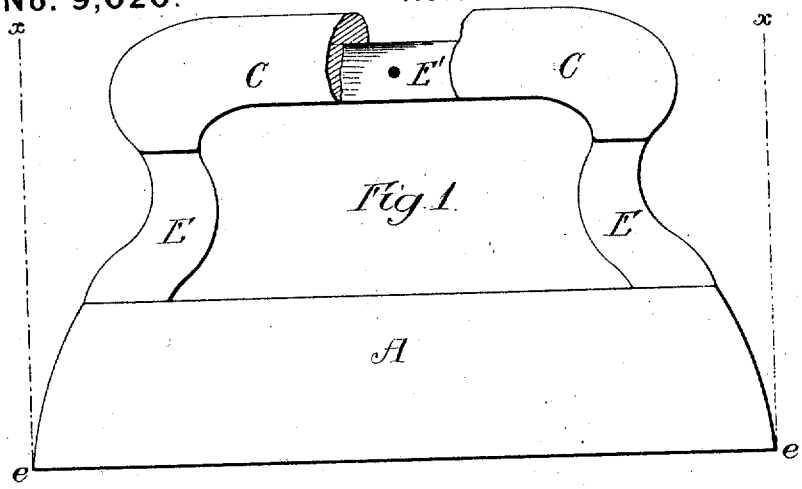
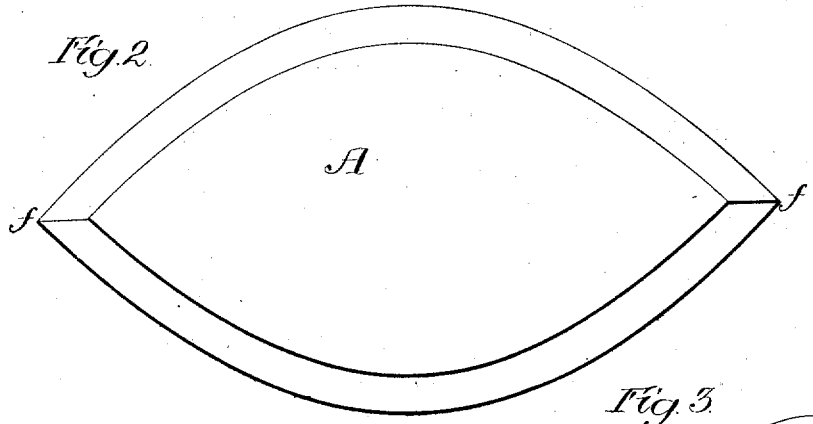
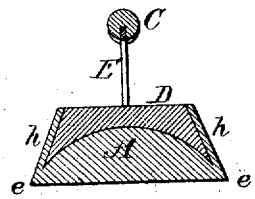
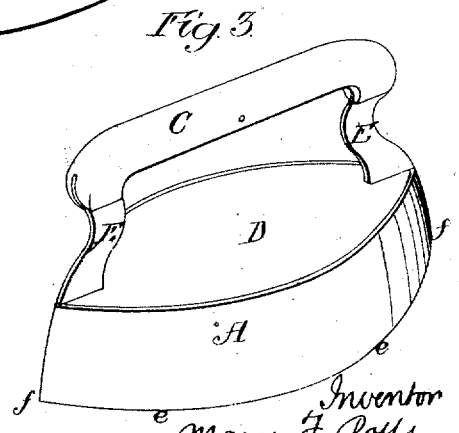
Witnesses
Henry Howson Jr.
Harry Smith
Inventor
Mary F. Potts
by her attorneys
Howson and Son

UNITED STATES PATENT OFFICE.

MARY FLORENCE POTTS, OF PHILADELPHIA, PENNSYLVANIA, ASSIGNOR, BY MESNE ASSIGNMENTS, TO ENTERPRISE MANUFACTURING COMPANY AND AMERICAN MACHINE COMPANY, BOTH OF SAME PLACE.

SAD-IRON.

SPECIFICATION forming part of Reissued Letters Patent No. 9,020, dated January 6, 1880.

Original No. 103,501, dated May 24, 1870. Application for Reissue filed June 20, 1879.

*To all whom it may concern:*

Be it known that I, MARY F. POTTS, formerly of Ottumwa, county of Wapello, State of Iowa, but now of Philadelphia, Pennsylvania, did invent certain Improvements in Sad-Irons, for which Letters Patent No. 103,501, were granted to me May 24, 1870; and I do hereby declare the following to be a full, clear, and exact description of the same.

The main object of my invention is to make a sad-iron which can be more conveniently manipulated than ordinary sad-irons; and this object I attain in the manner which I will now proceed to describe, reference being had to the accompanying drawings, in which—

Figure 1 is a side view of my improved sad-iron; Fig. 2, a plan view of the base; Fig. 3, a perspective view; and Fig. 4, a transverse section drawn to a reduced scale.

The base A of the sad-iron is widest at the middle and pointed at both ends, and the under or smoothing face of the base is bounded by comparatively sharp or abrupt edges *e e*, as shown in Fig. 4, these edges being represented in Fig. 2 by two curved lines meeting at opposite points *f f*.

A sad-iron having a smoothing-face of this peculiar shape is better adapted for effective and convenient manipulation and application to the fabric than one with an ordinary base, which is widest at the rear end and pointed at the front.

As shown in the drawings, the sides *h h* of the base are inclined upward and inward from the edges *e e*—in other words, the base is bounded by sides so beveled that it shall be largest at the bottom.

In the top of the base is a recess, which is packed tightly with non-conducting material D, such as plaster-of-paris, cement, clay, &c., which is retained in place by the inclined sides of the recess, and which limits the upward radiation of heat toward the handle. (See Fig. 4.)

To the base is attached a metal frame, of which E E are the posts, and E′ the cross-piece, and to the top of this frame is fitted and secured the wooden handle C, the rounded ends of which project over the tops of the posts and cover the cross-piece.

The handle is alike at both ends, and is in such a central position midway between the opposite ends of the base, as indicated by the dotted lines *x x*, that the sad-iron can be manipulated with equal convenience whether one end or other of the base is nearest to the operator.

I claim as my invention—

A sad-iron having a base widest at the middle, pointed at both ends, and bounded by inclined sides *h h*, beveled upward and inward from the edges *e e*, which form the limits of the smoothing-face, substantially as described.

In testimony whereof I have signed my name to this specification in the presence of two subscribing witnesses.

MARY F. POTTS.

Witnesses:

ALEXANDER PATTERSON,
HARRY SMITH.